United States Patent
Herman et al.

(10) Patent No.: US 10,255,631 B2
(45) Date of Patent: Apr. 9, 2019

(54) ANNOTATING A TRANSACTION HISTORY RECORD WITH MERCHANT INFORMATION IDENTIFIED FROM A MERCHANT IDENTIFIER AND USER COMPUTING DEVICE LOCATION DATA

(71) Applicant: GOOGLE INC., Mountain View, CA (US)

(72) Inventors: Jeffrey Lawrence Herman, Mountain View, CA (US); Qiming Fang, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 679 days.

(21) Appl. No.: 14/504,148

(22) Filed: Oct. 1, 2014

(65) Prior Publication Data
US 2016/0098790 A1 Apr. 7, 2016

(51) Int. Cl.
*G06Q 40/00* (2012.01)
*G06F 17/24* (2006.01)
*G06Q 30/06* (2012.01)
*G06Q 20/32* (2012.01)
*G06Q 20/20* (2012.01)

(52) U.S. Cl.
CPC .......... *G06Q 40/00* (2013.01); *G06F 17/241* (2013.01); *G06Q 20/209* (2013.01); *G06Q 20/3224* (2013.01); *G06Q 30/0633* (2013.01)

(58) Field of Classification Search
CPC ................................. G06Q 20/3224
USPC ........................................ 705/39
See application file for complete search history.

(56) References Cited

U.S. PATENT DOCUMENTS

2009/0144161 A1 6/2009 Fisher
2013/0151419 A1* 6/2013 Hitchcock .............. G06Q 30/06
705/75

(Continued)

FOREIGN PATENT DOCUMENTS

WO 2016/054226 A1 4/2016
WO 2016/054226 A8 4/2016

OTHER PUBLICATIONS

Falierou, "International Search Report and Written Opinion issued in International Application No. PCT/U2015/053245", dated Nov. 24, 2015, 11 pages.

*Primary Examiner* — Jessica Lemieux
(74) *Attorney, Agent, or Firm* — Johnson, Marcou & Isaacs, LLC

(57) ABSTRACT

A payment processing system receives one or more indications of a user's location at a time that the user initiates a transaction with a merchant system at a physical location of the merchant system, processes the transaction, and receives a merchant point of sale identifier from the issuer system associated with the financial account information selected by the user. The payment processing system creates a combined list of candidate merchant identities based on the received merchant POS identifier and the user computing device location. The payment processing system calculates a probability for each of the merchant identities in the list based on similarity to the merchant POS identifier and user location data. The payment processing system associates the merchant POS identifier with the merchant identity having the highest probability and creates an annotated transaction record to display to the user.

18 Claims, 8 Drawing Sheets

(56) References Cited

U.S. PATENT DOCUMENTS

| | | | |
|---|---|---|---|
| 2014/0006097 A1* | 1/2014 | Groarke | G06Q 30/02 705/7.29 |
| 2014/0006198 A1* | 1/2014 | Daly | G06Q 30/06 705/24 |
| 2014/0012704 A1* | 1/2014 | Mizhen | G06Q 30/06 705/26.41 |

* cited by examiner

ANNOTATING A TRANSACTION HISTORY RECORD WITH MERCHANT INFORMATION IDENTIFIED FROM A MERCHANT IDENTIFIER AND USER COMPUTING DEVICE LOCATION DATA

TECHNICAL FIELD

The present disclosure relates generally to providing transaction histories, and more particularly to annotating transaction histories with merchant information identified based on combining location data with merchant system identification information.

BACKGROUND

Users utilize online transaction histories associated with digital wallet accounts, credit accounts, or bank accounts to manage their credit card or debit card purchases. Generally, in online transaction histories, the merchant is identified with a merchant identifier that may comprise a string of alphanumeric characters and/or symbols that describe the merchant identity and/or a zip code associated with a merchant point of sale device used in the transaction. Users may have difficulty in identifying the merchant or merchant location where a transaction occurred based on the merchant identifier. The location of a user computing device at the time of a payment transaction may be determined by a payment processing system by logging location data of the user computing device at the time of the transaction.

Conventional technologies do not provide for updating a transaction record with merchant information determined based on location data associated with a user computing device at the time of the transaction.

SUMMARY

Techniques herein provide a computer-implemented method to update a transaction history record with merchant information determined based in part on location data associated with the transaction. In an example embodiment, a user registers with a payment processing system for a digital wallet account and enters financial account information. The payment processing system receives one or more indications of a user's location at a time that the user initiates a transaction with a merchant system at a physical location of the merchant system. The payment processing system processes the transaction and receives a merchant point of sale ("POS") identifier from the issuer system or financial institution system associated with the financial account information the user selected for use in the transaction. The payment processing system creates a combined list of canonical merchant identities based on the received merchant POS identifier and an identification of the location of the user computing device at the time the user initiated the transaction. The payment processing system calculates a probability for each of the merchant identities in the list based on similarity to the merchant POS identifier and user location data and selects the candidate merchant identity with the highest probability of corresponding to the merchant location at which the user transacted. The payment processing system associates the merchant POS identifier with the selected merchant identity and creates a transaction record of the transaction comprising information associated with the merchant to display to the user.

In certain other example aspects described herein, a system and a computer program product to update a transaction history record with merchant information determined based on location data associated with the transaction are provided.

These and other aspects, objects, features, and advantages of the example embodiments will become apparent to those having ordinary skill in the art upon consideration of the following detailed description of illustrated example embodiments.

DETAILED DESCRIPTION OF EXAMPLE EMBODIMENTS

Overview

Figure 1:
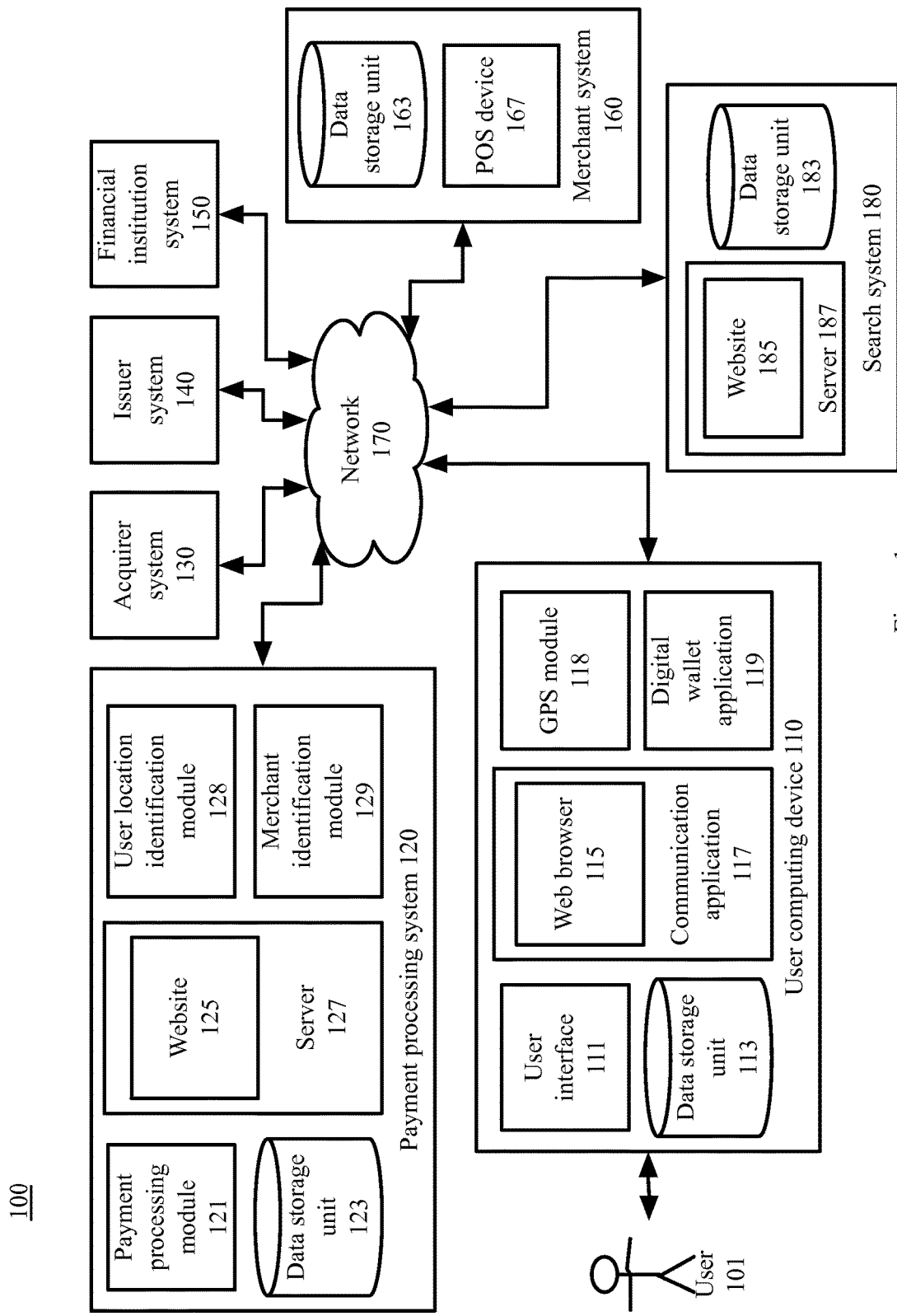
FIG. 1 is a block diagram depicting a system for updating a transaction history record with merchant information determined based on location data associated with a user computing device used in the transaction, in accordance with certain example embodiments.

The example embodiments described herein provide computer-implemented techniques for updating a transaction history record with merchant information determined based on location data associated with a user computing device used in the transaction. In an example embodiment, a user registers with a payment processing system for a digital wallet account and enters financial account information. The payment processing system receives one or more indications of a location of a user computing device associated with a user at a time that the user initiates a transaction with a merchant system at a physical location of the merchant system and locations of user computing devices associated with other users at the time that the other users initiated transactions with the same merchant system at the same physical location. The payment processing system processes the transaction and receives a merchant point of sale ("POS") identifier from the issuer system or financial institution system associated with the financial account information the user selected for use in the transaction. The payment processing system creates a combined list of candidate merchant identities based on the received merchant POS identifier and an identification of locations, at the time of transaction, of user computing devices associated with all users who initiated a transaction with the merchant system at the merchant location. The payment processing system calculates a probability for each of the merchant identities in the list based on similarity to the merchant POS identifier and user location data and selects the candidate merchant identity with the highest probability of being the merchant location at which the user transacted. The payment processing system associates the merchant POS identifier with the selected merchant identity and creates or annotates a transaction record of the transaction comprising information associated with the merchant to display to the user.

A user registers for a digital wallet account with a payment processing system. For example, a user accesses the payment processing system website, registers for a digital wallet account, and downloads a digital wallet application onto a user computing device associated with the user. In an example embodiment, the digital wallet application communicates with the payment processing system. The user enters financial account information into the digital wallet account via the digital wallet application on the user computing device. For example, the user enters financial account information associated with one or more credit card accounts, debit card accounts, bank accounts, and/or other appropriate financial accounts into the digital wallet account via the digital wallet application. Example financial account information may comprise a financial account type, a financial account number, an expiration date, a card verification value ("CVV"), a name associated with the financial account, an address, a zip code, and any other relevant information associated with the financial account.

The payment processing system receives zero, one, or more indications of the location of a user computing device. In an example embodiment, a user searches for a merchant system physical location and the payment processing system receives the user search. For example, the user is interested in visiting the physical location of the merchant system and searches for the merchant system on a mapping application or a search application associated with the payment processing system using the user computing device. In this example embodiment, the payment processing system, by receiving the search for the merchant system physical location, knows that the user may potentially visit the location in the future. In another example embodiment, the user authorizes the payment processing system to log location data transmitted by the user computing device. In this example embodiment, the user arrives at the merchant system physical location and the payment processing system logs the location of the user computing device at the merchant system location. For example, the user computing device comprises a GPS module and the payment processing system logs the longitude and latitude of the user computing device via the GPS module on the user computing device. In this example, the payment processing system may correlate the received longitude, latitude, or other received location data with a physical street address.

The user selects one or more items for purchase and initiates a digital wallet transaction with the merchant system at the merchant location. In an example, the user taps the user computing device to a merchant POS device to transfer financial account information to the merchant POS device via a near field communication ("NFC") channel, a Wi-Fi communication channel, or other communication channel. In another example embodiment, the user uses a form of payment that does not involve the user computing device. For example, the user swipes a physical payment card, such as a debit, credit, or gift card, at the merchant POS device to transfer financial account information stored on the payment card to the merchant POS device. The merchant POS device transmits a payment authorization request to the financial institution system or issuer system associated with the user's selected payment method. In an example embodiment, the payment processing system receives an approval of the payment request and a merchant POS identifier. An example POS identifier is a string of characters, numbers, and/or symbols that identify the merchant POS device. The payment processing system completes the transaction. Based on the received merchant POS identifier, the payment processing system generates a first list of candidate merchants and determines a probability for each of the candidate merchants on the first list based on the similarity to the merchant POS identifier. The payment processing system determines the location of the user computing device at the time of the transaction, generates a second list of candidate merchants based on the location determination, and calculates a probability for each of the candidate merchants on the second list based on the location determination. In an example embodiment, the payment processing system determines the user computing device location at the time of the transaction based on a received user search and/or location data received from the user computing device at the time of the transaction.

The payment processing system retrieves aggregate data associated with the received merchant POS identifier. The payment processing system generates a combined list of candidate merchants based on the first and second lists and determines a combined probability for each candidate merchant based on user data and the aggregate data. For example, the combined probability for a candidate merchant may be calculated by multiplying the probability for the merchant from the first list by the probability for the merchant from the second list. The payment processing system selects the candidate merchant from the combined list with the highest combined probability. For example, the combined probability for a candidate merchant may be calculated by multiplying the probability for the merchant from the first list by the probability for the merchant from the second list. The payment processing system retrieves information associated with the selected candidate merchant and inserts a merchant identity and associated merchant information in the transaction record associated with the transaction. In another example embodiment, the payment processing system annotates the transaction record associated with the transaction with the merchant identity and associated merchant information. In yet another example embodiment, the payment processing system annotates the transaction record associated with the transaction with a link that, when selected by the user via the user computing device, directs the web browser of the user computing device to a web page that displays the merchant identity and associated merchant information.

The user selects the digital wallet application on the user computing device. The user accesses his transaction history and selects the merchant identity associated with the transaction in the transaction record. The user computing device web browser is directed to a map of the merchant location comprising information associated with the merchant.

Example System Architecture

Turning now to the drawings, in which like numerals indicate like (but not necessarily identical) elements throughout the figures, example embodiments are described in detail.

FIG. 1 is a block diagram depicting a system 100 for updating a transaction history record with merchant information determined based on location data associated with a user computing device used in the transaction, in accordance with certain example embodiments. As depicted in FIG. 1, the system 100 includes network computing devices 110, 120, 130, 140, 150, and 160 that are configured to communicate with one another via one or more networks 170. In some embodiments, a user associated with a device must install an application and/or make a feature selection to obtain the benefits of the techniques described herein.

In example embodiments, the network 170 can include a local area network ("LAN"), a wide area network ("WAN"), an intranet, an Internet, storage area network ("SAN"), personal area network ("PAN"), a metropolitan area network ("MAN"), a wireless local area network ("WLAN"), a virtual private network ("VPN"), a cellular or other mobile communication network, Bluetooth, Bluetooth low energy, NFC, or any combination thereof or any other appropriate architecture or system that facilitates the communication of signals, data, and/or messages, and allows for the measurement of a received signal strength indicator ("RSSI") or other similar measurement such as the free space path loss, the received channel power indicator ("RCPI"), the time of arrival ("TOA"), and/or the round trip time ("RTT"). Throughout the discussion of example embodiments, it should be understood that the terms "data" and "information" are used interchangeably herein to refer to text, images, audio, video, or any other form of information that can exist in a computer-based environment.

Each network computing device 110, 120, 130, 140, 150, and 160 includes a device having a communication module capable of transmitting and receiving data over the network 170. For example, each network computing device 110, 120, 130, 140, 150, and 160 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the network computing devices 110, 120, 130, 140, 150, and 160 are operated by users 101, payment processing system operators, acquirer system operators, issuer system operators, financial institution system operators, and merchant system operators, respectively.

An example user computing device 110 comprises a user interface 111, a data storage unit 113, a web browser 115, a communication application 117, a GPS module 118, and a digital wallet application 119. In an example embodiment, the user interface 111 enables the user 101 to interact with the web browser 115 and/or the digital wallet application 119. For example, the user interface 111 may be a touch screen, a voice-based interface or any other interface that allows the user 101 to provide input and receive output from an application or module on the user computing device 110.

In an example embodiment, the data storage unit 113 comprises a local or remote data storage structure accessible to the user computing device 110 suitable for storing information. In an example embodiment, the data storage unit 113 stores encrypted information, such as HTML5 local storage.

In an example embodiment, the user 101 can use a communication application 117, such as a web browser 115 application or a stand-alone application, to view, download, upload, or otherwise access documents or web pages via a distributed network 170.

In an example embodiment, the web browser 115 can enable the user 101 to interact with web pages using the user computing device 110. In an example embodiment, the user 101 may view transaction history from the payment processing system website 125 associated with the user's 101 digital wallet account via the web browser 113.

In an example embodiment, the communication application 117 can interact with web servers or other computing devices connected to the network 170, including the user computing device 110 and a web server of a merchant system associated with the merchant beacon device 130.

In an example embodiment, the digital wallet application 119 is a program, function, routine, applet, or similar entity that exists on and performs its operations on the user computing device 110. In certain embodiments, the user 101 must install the digital wallet application 119 and/or make a feature selection on the user computing device 110 to obtain the benefits of the techniques described herein. In an example embodiment, the user 101 saves financial account information in the user's 101 digital wallet account via the digital wallet application 119. For example, the user 101 selects the digital wallet application 119 on the user computing device 110 and enters financial account information via the user interface 111 of the user computing device 110. In an example embodiment, the user 101 initiates a transaction with the merchant POS device 167 by selecting financial account information on the digital wallet application 119 and tapping the user computing device 110 to the merchant POS device 167. In this example embodiment, the user computing device 110 communicates financial account information selected by the user from the digital wallet application 119 to the merchant POS device 167 via a near field communication ("NFC"), Bluetooth, or Wi-Fi communication channel. In an example embodiment, the user 101 may access a transaction history associated with the user's 101 digital wallet account via the digital wallet application 119.

An example payment processing system 120 comprises a payment processing module 121, a data storage unit 123, a website 125, a server 127, a user location identification module 128, and a merchant identification module 129.

In an example embodiment, the payment processing module 121 communicates with the financial institution system 150, the merchant system 160, the issuer system 140, and/or the acquirer system 130 to process payments. In an example embodiment, the payment processing module 121 receives a payment authorization approval from the issuer system 140 comprising a merchant identifier. For example, the payment processing module 121 receives a credit authorization from the issuer system 140. In another example embodiment, the payment processing system 121 receives an approval of a payment authorization request from the financial institution system 150 comprising a merchant identifier. In an example embodiment, the payment processing module 121 receives a denial of the payment request from the issuer system 140 or financial institution system 150. In another example embodiment, the payment processing module 121 receives an approval of the payment request from the issuer system 140 or financial institution system 150. In an example embodiment, the payment processing module 121 generates a receipt of the transaction and transmits the receipt to the user computing device 110.

In an example embodiment, the data storage unit 123 comprises a local or remote data storage structure accessible to the payment processing system 120 suitable for storing information. In an example embodiment, the data storage unit 123 stores encrypted information, such as HTML5 local storage. In an example embodiment, the data storage unit 123 stores user 101 financial account information and/or user 101 credit account information.

In an example embodiment, the payment processing system website 125 comprises a website that user 101 may access via the web browser 115 and/or digital wallet application 119 on the user computing device 110. In an example embodiment, user 101 may access the user's 101 digital wallet account via the payment processing system website 125.

In an example embodiment, the web server 127 provides content accessible by the user 101 through the web browser 115 and/or digital wallet application 119 on the user computing device 110, including but not limited to html documents, images, style sheets, and scripts. In an example embodiment, the server 127 supports the payment processing system website 125.

In an example embodiment, the user location identification module 128 receives user computing device 110 location data from the user computing device 110 via the network 170. In an example embodiment, the user location identification module 128 periodically receives location data from the user computing device 110. In another example embodiment, the user location identification module 128 transmits a request to the user computing device 110, in response to the user 101 initiating a digital wallet transaction, for the current physical location of the user computing device 110. In this example embodiment, the user computing device 110 determines its current location and transmits the location data to the user location identification module 128. Example received user computing device 110 location data comprises a longitude and latitude of the user computing device 110 and a time that the location was determined. In an example embodiment, the user location identification module 128 logs received user computing device 110 location data and saves the location data in the data storage unit 123. In an example embodiment, the user location identification module communicates with the data storage unit 123 to determine the location of the user computing device 110 at the time of a digital wallet transaction.

In an example embodiment, the merchant identification module 129 communicates with the user location identification module 128 to determine location data of the user computing device 110 at the time of the digital wallet transaction. In an example embodiment, the merchant identification module 129 receives a merchant identifier 129 from the issuer system 140 or financial institution system 150. In an example embodiment, the merchant identification module 129 maintains a directory of merchant identities and associated merchant information and any known merchant identifiers corresponding to merchant identities. In an example embodiment, the merchant identification module 129 generates a first list of candidate merchants based on a merchant identifier received from the issuer system 140 or financial institution system 150 and a second list of candidate merchants based on user computing device 110 location data associated with the digital wallet transaction. In this example embodiment, the first list and second list are extracted from the directory of merchant identities maintained by the merchant identification module 129. In this example embodiment, the merchant identification module 129 determines a probability for each candidate merchant. For example, this probability is the probability that each candidate merchant is the actual merchant with which the user 101 transacted in the digital wallet transaction.

In an example embodiment, the merchant identification module 129 retrieves aggregate user data associated with the merchant identifier from the data storage unit 123. In an example embodiment, the merchant identification module 129 receives user 101 search data from the search system 180. In an example embodiment, the merchant identification module 129 generates a combined list of candidate merchants based on the first and second lists and further based on the aggregate user data and the received user 101 search data. In an example embodiment, the merchant identification module 129 determines a combined probability for each of the candidate merchants on the combined list based on corresponding probabilities in the first and second lists, aggregate user data, and user 101 search data. In an example embodiment, the merchant identification module 129 selects the candidate merchant from the combined list having the highest probability and annotates the user's 101 transaction history with information associated with the selected candidate merchant. For example, the merchant identification module 129 inserts a link to the transaction record of the user's 101 transaction history associated with the digital wallet transaction that, when selected by the user 101, redirects the user computing device web browser 113 to a map comprising an indication of the location of the merchant system 160 at which the user 101 transacted and associated merchant system 160 information such as an address, telephone number, hours of operation, a merchant system 160 website, and/or other relevant merchant system 160 information.

In certain example embodiments, one or more functions performed by the merchant identification module 129 may be performed by the user location identification module 128. In certain example embodiments, one or more functions performed by the user location identification module 128 may be performed by the merchant identification module 129.

In an example embodiment, the acquirer system 130 communicates with the issuer system 140 to approve a credit authorization and to make payment to the payment processing system 120 and/or merchant system 160. In an example embodiment, the acquirer system 130 receives a payment authorization request from the merchant POS device 167 and routes the payment authorization request to the issuer system 140. In an example embodiment, the received payment authorization request comprises a merchant identifier associated with the merchant POS device 167.

In an example embodiment, the issuer system 140 receives a payment authorization request from the merchant POS device 167 through the acquirer system 130 and approves or denies the payment authorization request. An example payment authorization request comprises a merchant identifier. For example, the merchant identifier is associated with the merchant POS device 167. In an example, the payment authorization request comprises a credit authorization request. In an example embodiment, the issuer system 140 communicates with the acquirer system 150 to approve a payment authorization request and to make payment to the payment processing system 120 and/or merchant system 160. In an example embodiment, the issuer system 140 and/or the acquirer system 150 transmits a notification of approval of the payment authorization request to the payment processing system 120. An example notification of approval of the payment authorization request comprises the merchant identifier. In another example embodiment, the issuer system 140 denies the payment authorization request received from the payment processing system 120. In this example embodiment, the issuer system 140 transmits a notification of denial of the payment authorization request to the payment processing system 120.

In an example embodiment, the financial institution system 150 receives a payment authorization associated with a transaction initiated by the user 101 from the merchant POS device 167. In an example embodiment, the financial institution system 150 is associated with financial account information selected by the user 101 for use in a transaction. For example, the user 101 maintains a bank account or a debit card account with the financial account system 150, which may be a bank. In an example embodiment, the financial institution system 150 approves the payment authorization request and transmits a notification of approval of the payment request to the payment processing system 120. An example notification of approval of the payment request comprises the merchant identifier. For example, the merchant identifier is associated with the merchant POS device 167. In an example embodiment, the financial institution system 150 may transfer funds from the user's 101 account associated with the financial institution system 150 to a merchant system 160 account or to a payment processing system 120 account associated with the financial institution system 150 or another financial institution system. In another example embodiment, the financial institution system 150 denies the payment authorization request and transmits a notification of denial of the payment authorization request to the payment processing system 120.

An example merchant system 160 comprises a data storage unit 163 and a point of sale ("POS") device 167.

In an example embodiment, the data storage unit 163 comprises a local or remote data storage structure accessible to the merchant system 160 suitable for storing information. In an example embodiment, the data storage unit 163 stores encrypted information, such as HTML5 local storage.

In an example embodiment, the merchant system POS device 167 comprises a POS terminal (not depicted) capable of processing a purchase transaction initiated by a user 101, for example, a cash register. In an example embodiment, the merchant system POS device 167 communicates with the user computing device 110 to receive financial account information selected by the user 101 from the user's 101 digital wallet account for use in a transaction. In an example embodiment, the merchant POS device 167 communicates with the user computing device 110 via a near field communication ("NFC") protocol. For example, the user computing device 110 establishes an NFC communication channel with the merchant system POS device 167 and the merchant system POS device 167 receives financial account information selected by the user for use in the transaction. In an example embodiment, the merchant system POS device 167 communicates a payment authorization request to an issuer system 140 through an acquirer system 130 via a credit card network. For example, the issuer system 140 is associated with a credit account selected by the user 101 for use in the transaction. In another example embodiment, the merchant system POS device 167 communicates a payment authorization request to a financial institution system 150. For example, the financial institution system 150 is associated with a bank account selected by the user 101 for use in the transaction. In an example embodiment, the payment authorization request that the merchant POS device 167 transmits to the issuer system 140 or financial institution system 150 comprises a merchant identifier associated with the merchant system POS device 167.

An example search system 180 comprises a data storage unit 183, a website 185, and a server 187.

In an example embodiment, the data storage unit 183 comprises a local or remote data storage structure accessible to the search system 180 suitable for storing information. In an example embodiment, the data storage unit 183 stores encrypted information, such as HTML5 local storage. In an example embodiment, the search system 180 stores one or more search terms submitted by the user 101 in the data storage unit 183.

In an example embodiment, the website 185 comprises a website that user 101 may access via the web browser 115 and/or digital wallet application 119 on the user computing device 110. In an example embodiment, user 101 may submit a search term to the search system website 185 via the user computing device 110. For example, the user 101, at a time before initiating a digital wallet transaction at the merchant system 160 location, submits a search term to the merchant system website 185.

In an example embodiment, the web server 187 provides content accessible by the user 101 through the web browser 115 on the user computing device 110, including but not limited to html documents, images, style sheets, and scripts. In an example embodiment, the server 187 supports the payment processing system website 185.

It will be appreciated that the network connections shown are example and other means of establishing a communications link between the computers and devices can be used. Moreover, those having ordinary skill in the art having the benefit of the present disclosure will appreciate that the user computing device 110, the payment processing system 120, the acquirer system 130, the issuer system 140, the financial institution system 150, and the merchant system 160 illustrated in FIG. 1 can have any of several other suitable computer system configurations. For example, a user computing device 110 embodied as a mobile phone or handheld computer may or may not include all the components described above.

Figure 8:
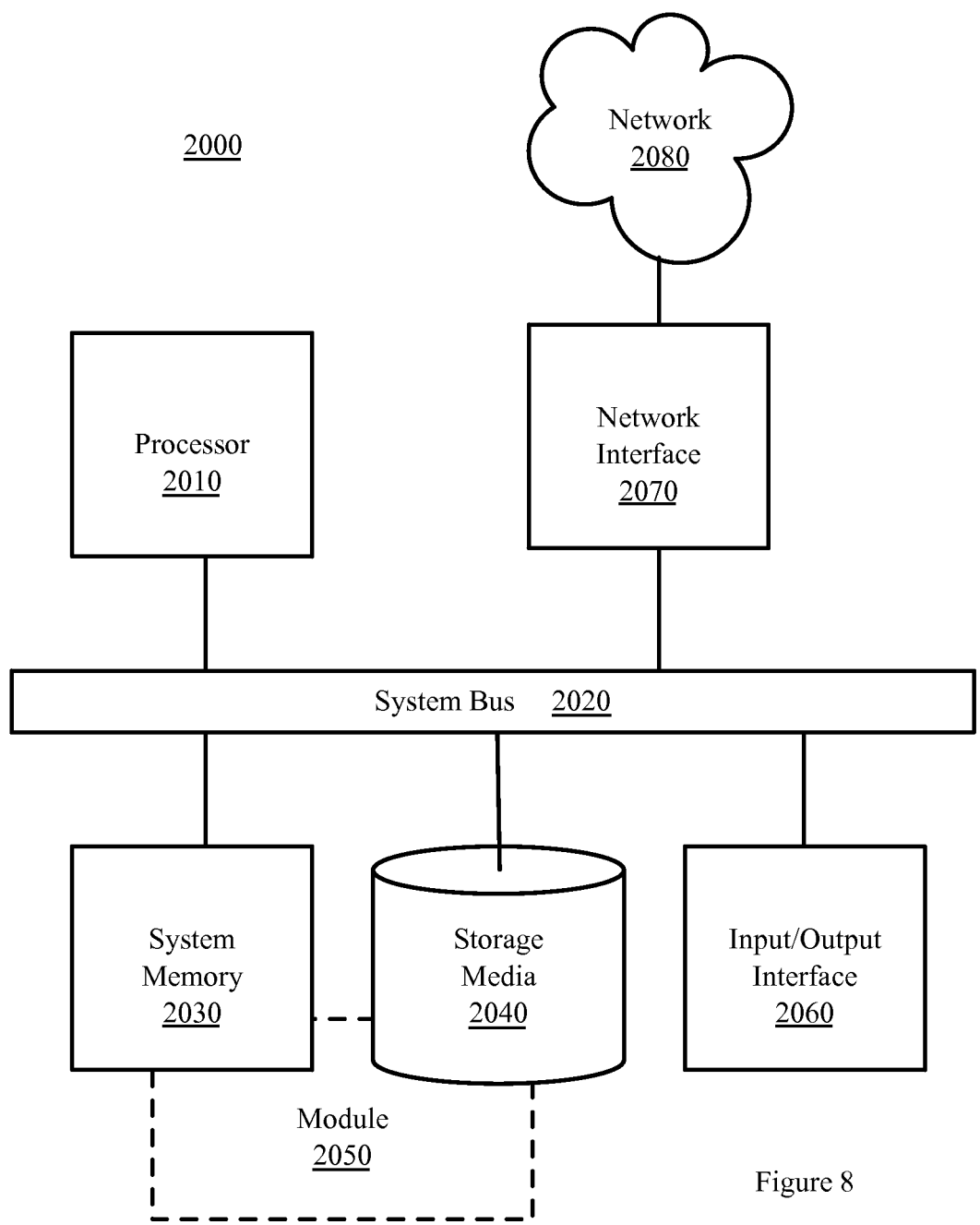
FIG. 8 is a block diagram depicting a computing machine and module, in accordance with certain example embodiments.

In example embodiments, the network computing devices and any other computing machines associated with the technology presented herein may be any type of computing machine such as, but not limited to, those discussed in more detail with respect to FIG. 8. Furthermore, any modules associated with any of these computing machines, such as modules described herein or any other modules (scripts, web content, software, firmware, or hardware) associated with the technology presented herein may by any of the modules discussed in more detail with respect to FIG. 8. The computing machines discussed herein may communicate with one another as well as other computer machines or communication systems over one or more networks, such as network 170. The network 170 may include any type of data or communications network, including any of the network technology discussed with respect to FIG. 8.

Example Processes

The example methods illustrated in FIGS. 2-7 are described hereinafter with respect to the components of the example operating environment 100. The example methods of FIGS. 2-7 may also be performed with other systems and in other environments.

Figure 2:
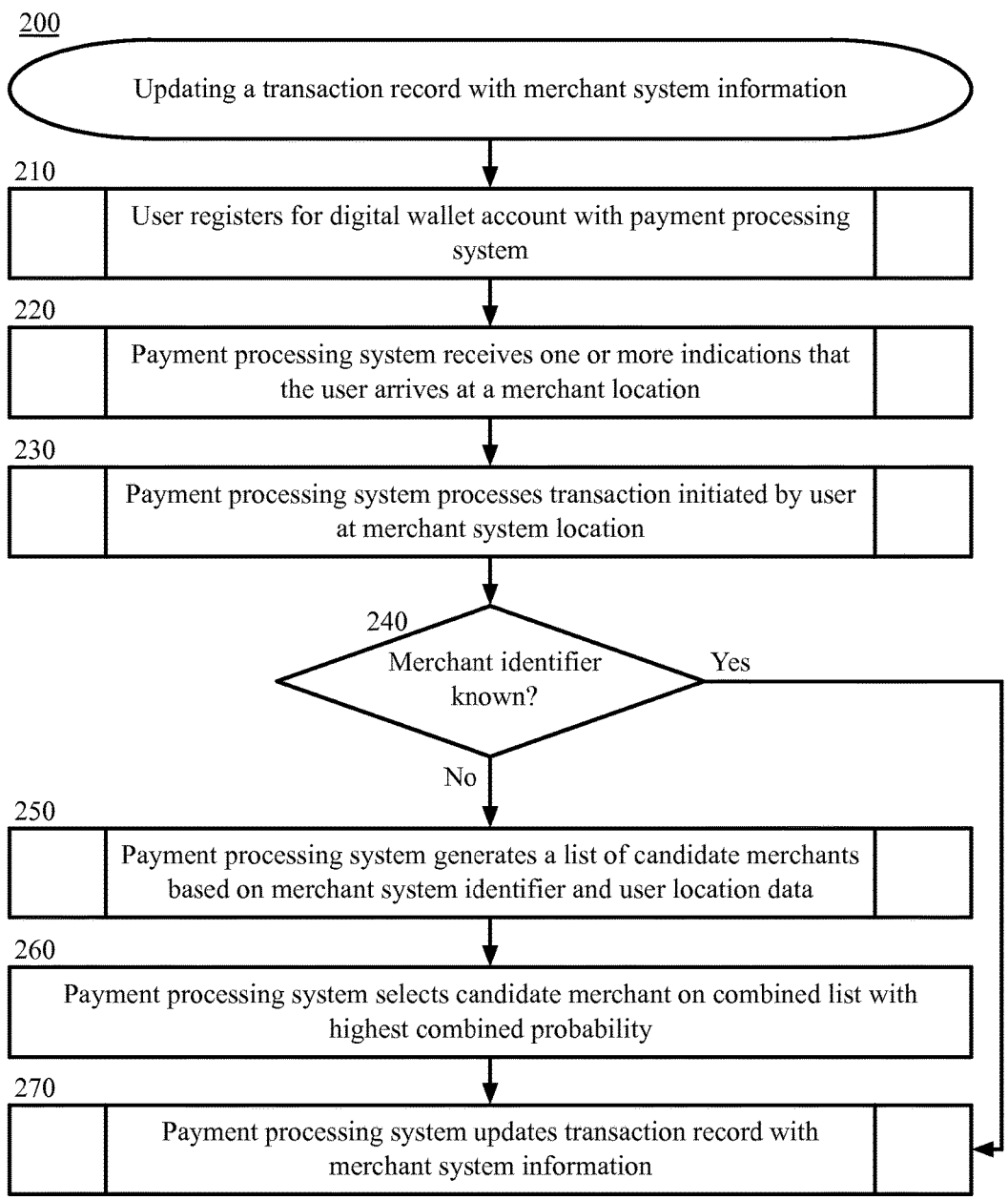
FIG. 2 is a block flow diagram depicting a method for updating a transaction history record with merchant system information determined based on location data associated with a user computing device used in the transaction, in accordance with certain example embodiments.

FIG. 2 is a block diagram depicting a method 200 for updating a transaction record with merchant system 160 information, in accordance with certain example embodiments. The method 200 is described with reference to the components illustrated in FIG. 1.

In block 210, the user 101 registers for a digital wallet account with a payment processing system 120. The method for registering a digital wallet account with a payment processing system 120 is described in more detail hereinafter with reference to the method described in FIG. 3.

Figure 3:
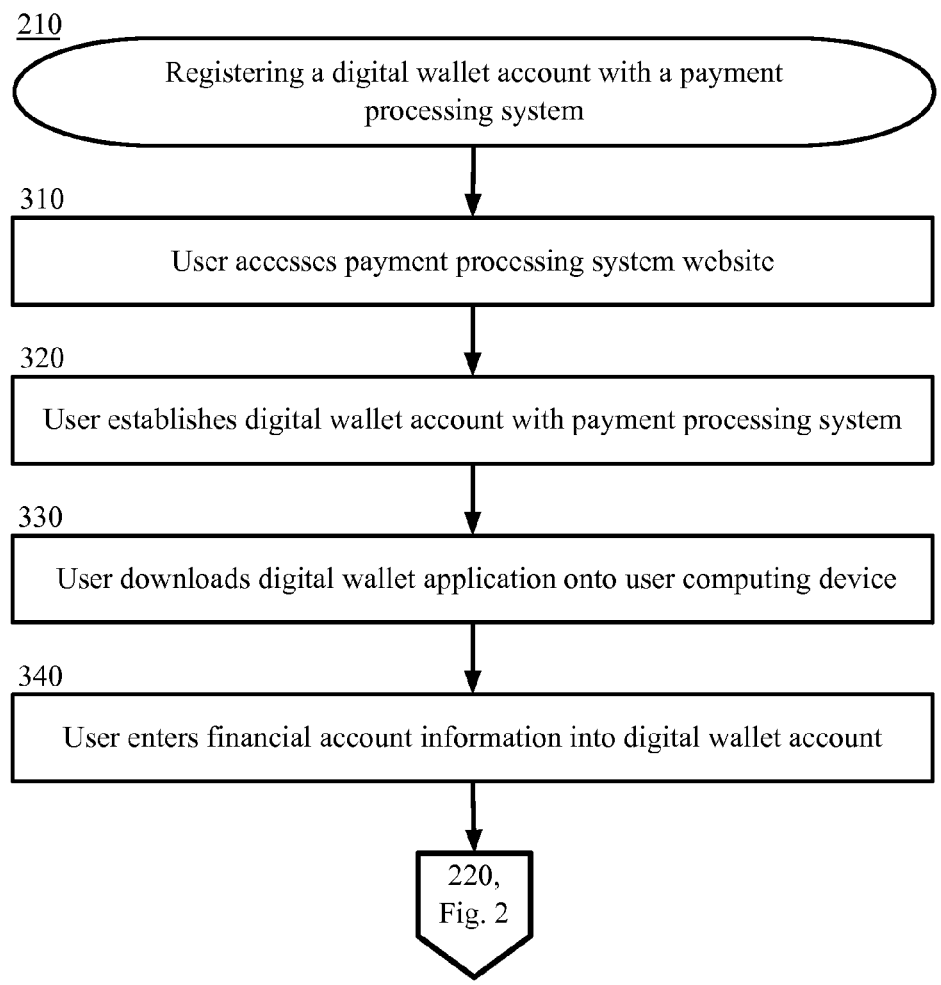
FIG. 3 is a block flow diagram depicting a method for registering a digital wallet account with a payment processing system, in accordance with certain example embodiments.

FIG. 3 is a block diagram depicting a method 210 for registering a digital wallet account with a payment processing system 120, in accordance with certain example embodiments. The method 210 is described with reference to the components illustrated in FIG. 1.

In block 310, the user 101 accesses a payment processing system website 125. In an example embodiment, the user 101 accesses the payment processing system website 125 via the user computing device 110 web browser 115. For example, the user 101 enters the website 125 address in the address bar of the web browser 115 to access the website 125. In another example embodiment, the user 101 accesses the payment processing system website 125 using an application resident on the user computing device 110. For example, the user 101 selects an application on the user computing device 110 that connects the user 101 to the payment processing system website 125.

In block 320, the user 101 establishes a digital wallet account with the payment processing system 120. In an example embodiment, the user 101 registers a username and a password associated with the digital wallet account to use to sign in to the account. In an example embodiment, the digital wallet account is associated with one or more additional services, such as an email service, a messaging service, a gaming service, or a mapping service.

In block 330, the user 101 downloads a digital wallet application 119 onto the user computing device 110. In an example embodiment, the digital wallet application 119 communicates with the payment processing system 120 over the network 170. In an example embodiment, the digital wallet application 119 is associated with the digital wallet account and is operable to allow the user 101 to access the digital wallet account and/or services provided by the payment processing system 120. In another example embodiment, the digital wallet application 119 is downloaded on the user computing device 110 before the user 101 establishes the user account with the payment processing system 120. In certain example embodiments, the user 101 does not download the digital wallet application 119 onto the user computing device 110. For example, the user 101 may use the web browser 115 to log into the digital wallet account on the payment processing system website 125.

In block 340, the user 101 enters financial account information into the digital wallet account. In an example embodiment, the user 101 enters financial account information associated with one or more credit accounts and/or bank accounts. For example, financial account information may comprise a financial account number or payment card number, a name associated with the financial account, a date associated with the expiration of a payment card associated with the financial account, a payment card verification number, an address associated with the financial account, a zip code, and/or additional necessary information to conduct a transaction using the financial account.

From block 340, the method 210 proceeds to block 220 of FIG. 2.

Returning to FIG. 2, in block 220, the payment processing system 120 receives one or more indications that the user 101 arrives at a merchant system 160 location. The method for receiving one or more indications of a user 101 location from a user computing device 110 is described in more detail hereinafter with reference to the method described in FIG. 4.

Figure 4:
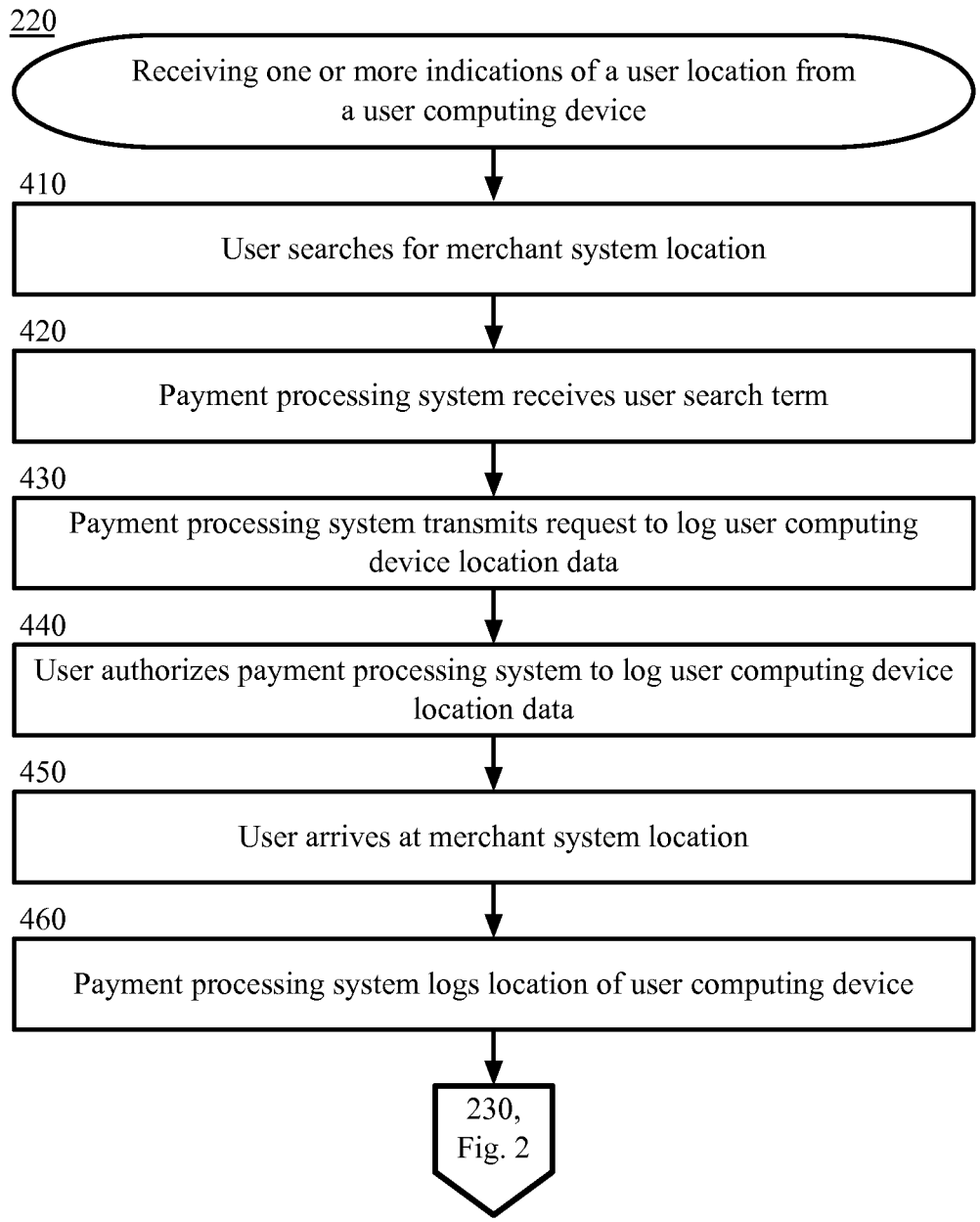
FIG. 4 is a block flow diagram depicting a method for receiving one or more indications of a user location from a user computing device, in accordance with certain example embodiments.

FIG. 4 is a block diagram depicting a method 220 for receiving one or more indications of a user 101 location from a user computing device 110, in accordance with certain example embodiments. The method 220 is described with reference to the components illustrated in FIG. 1.

In block 410, the user 101 searches for a merchant system 160 location. In an example embodiment, payment processing system 120 is associated with and/or communicates with a search system 180 over the network 170. In an example embodiment, the user 101 communicates a search term to the search system website 185 over the network 170 via a search application resident on the user computing device 110. In another example embodiment, the user 101 communicates a search term to the search system 180 over the network 170 via the web browser 115 of the user computing device 110. In these example embodiments, the search system communicates the received user 101 search term to the payment processing system 120. For example, the user 101 enters a search term on the search system website 185 for "Italian restaurants, Lawrenceville, Ga." via the user computing device 110 web browser 115. In this example, the search system website 185 receives the user 101 search term and communicates the search term to the payment processing system 120. In an example embodiment, the user 101 may receive one or more search results from the search system 180 in response to the search system 180 receiving the user 101 search term. For example, the user 101 may receive an annotated map of Lawrenceville, Ga. with locations of nearby Italian restaurants in response to searching for "Italian restaurants, Lawrenceville, Ga."

In block 420, the payment processing system 120 receives the user 101 search term. In an example embodiment, the payment processing system 120 saves the user 101 search in the data storage unit 123. In an example embodiment, the payment processing system 120 receives one or more interactions of the user 101 with search results provided by the search system. For example, the search system 180 provides a map of Italian restaurant merchant locations in Lawrenceville, Ga., in response to the user 101 submitting a search for "Italian restaurants, Lawrenceville, Ga." In this example, the user 101 selects, via the user interface 111 of the user computing device 110, one or more merchant system locations on the received map of merchant locations. In this example, the search system 180 receives the user 101 selection and the search system 180 communicates the user 101 selection of the one or more merchant locations to the payment processing system 120.

In block 430, the payment processing system 120 transmits a request to log user computing device 110 location data. In an example embodiment, the request to log location data is transmitted to the digital wallet application 119. In another example embodiment, the request is transmitted via the web browser 115. In an example embodiment, the request to log user computing device 110 location data is transmitted to the user computing device 110 when the user 101 establishes a digital wallet account with the payment processing system 120. In an example embodiment, the user computing device 110 displays the request to log user computing device 110 location data to the user 101 via the user interface 111. For example, the request to log user computing device 110 location data may read, "would you like to enable location based services?" In an example, the request may present the user 101 with objects on the user interface 111 that read "yes," "no," or "please give me more information."

In block 440, the user 101 authorizes the payment processing system 120 to log user computing device 110 location data. In an example embodiment, logging location data comprises receiving, from the user computing device 110, an indication of the physical location of the user computing device 110. For example, the payment processing system 120 may log a longitude, latitude, and time received from the GPS module 118 of the user computing device 110. In an example embodiment, to authorize the payment processing system 120 to log user computing device 110 location data, the user 101 actuates an object on the user interface 111 corresponding to an option to authorize the received request to log location data. In an example embodiment, in response to the user 101 selecting an option to authorize the payment processing system 120 to log location data, the payment processing system 120 receives notification of the user's selection to authorize logging of location data. In another example embodiment, the user 101 denies the request to authorize the payment processing system 120 to log location data. In an example embodiment, the user 101 may retract an authorization for the payment processing system 120 to log user computing device 110 location data by configuring settings on the digital wallet application 119 or digital wallet account.

In block 450, the user 101 arrives at the merchant system 160 location. In the example embodiments described herein, the user 101 brings the user computing device 110 to the merchant system 160 location. In an example embodiment, the user 101 searches for the merchant system 160 or received a search result for the merchant system 160 at a time before arriving at the merchant system 160 location. For example, the user 101 submits a search term to the search system website 185 for "Italian restaurants, Lawrenceville, Ga.," receives a search result comprising information associated with "ABC Italian Restaurant, 120 Main Street, Lawrenceville, Ga.," a merchant system 160 location. At a later time, the user 101 arrives at this street address with the user computing device 110.

In block 460, the payment processing system 120 logs the location of the user computing device 110. In an example embodiment, the user computing device GPS module 118 determines the approximate latitude and longitude of the location of the user computing device 110 based on the global positioning system ("GPS"). In another example embodiment, the user computing device 110 determines its physical location by communicating with one or more cell towers or Wi-Fi providers. In an example embodiment, the payment processing system 120 transmits a request to the user computing device 110 for the current location of the user computing device 110. In this example embodiment, in response to receiving the request for the current location, the user computing device 110 transmits the current location as determined by the GPS module 118 or other method to the payment processing system 120. In another example embodiment, the user computing device 110 periodically transmits the user computing device 110 location to the payment processing system 120. For example, the user computing device 110 may transmit the current location of the user computing device 110 every five minutes.

From block 460, the method 220 proceeds to block 220 of FIG. 2.

Returning to FIG. 2, in block 230, the payment processing system 120 processes a transaction initiated by the user 101 at the merchant system 160 location. The method for processing a transaction is described in more detail hereinafter with reference to the method 230 described in FIG. 5.

Figure 5:
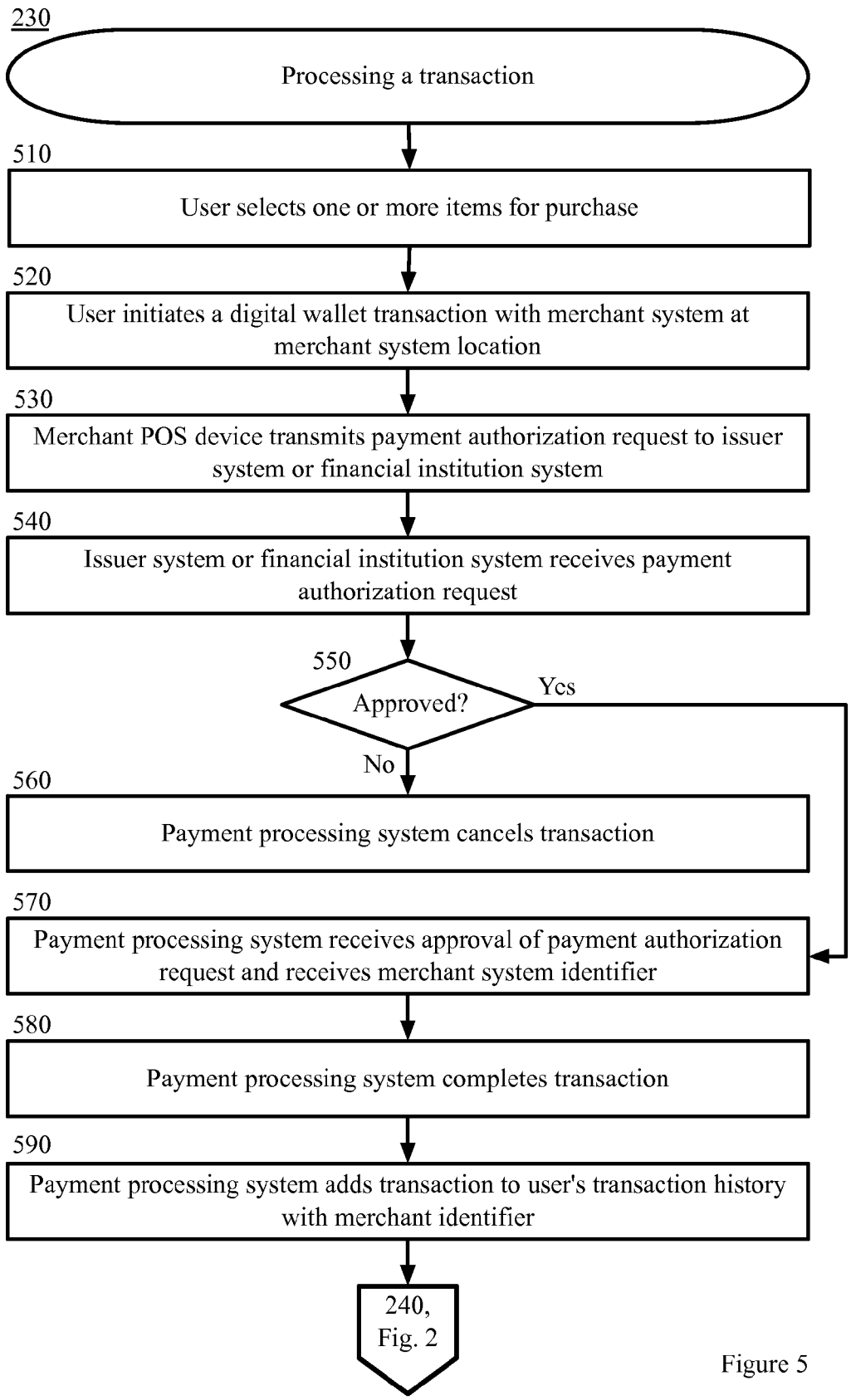
FIG. 5 is a block flow diagram depicting a method for processing a transaction, in accordance with certain example embodiments.

FIG. 5 is a block diagram depicting a method 230 for processing a transaction, in accordance with certain example embodiments. The method 230 is described with reference to the components illustrated in FIG. 1.

In block 510, the user 101 selects one or more items for purchase. In an example embodiment, the user 101 selects one or more items or services for purchase at the merchant system 160 location. For example, the user 101 orders several items at a restaurant.

In block 520, the user 101 initiates a digital wallet transaction with the merchant system 160 at the merchant system 160 location. For example, the user 101 desires to purchase the one or items or services selected by the user 101. In an example embodiment, the user computing device 110 communicates financial account information selected by the user 101 from the user's 101 digital wallet account via near field communication ("NFC") to a merchant system point of sale ("POS") device 167 at the merchant system 160 location. In another example embodiment, the user computing device 110 communicates with the merchant POS device 167 via a Bluetooth or Wi-Fi communication channel. For example, a merchant system POS device 167 comprises a cash register. In an example embodiment, the digital wallet application 119 comprises financial account information associated with one or more financial accounts of the user 101. In an example embodiment, the digital wallet application 119 displays on the user computing device 110 a request to select financial account information for use in the transaction. In this example embodiment, the user 101 selects financial account information associated with a credit account associated with an issuer system 140 or a bank account associated with a financial institution system 150. In an example, after selecting financial account information on the digital wallet application 119, the user 101 taps the user computing device 110 to the merchant system POS device 167 to start a transaction and communicate the financial account information to the POS device 167. In other example embodiments, the user computing device 110 communicates with another computing device operated by a merchant system 160 operator that can communicate with an acquirer system 130, issuer system 140, and/or financial institution system 150 associated with the user's 101 selected financial account information.

In block 530, the merchant system POS device 167 transmits a payment authorization request to an issuer system 140 or financial institution system 150. In an example embodiment, in response to receiving financial information from the user computing device 110 associated with a user's 101 credit account, the payment processing system 120 may communicate the payment authorization request to the issuer system 140 via the acquirer system 130. In another example embodiment, in response to receiving financial account information associated with a user's 101 bank account, the payment processing system 120 transmits the payment authorization request to a financial institution system 150. In this example, the financial institution system 150 is the user's 101 bank. An example payment authorization request comprises a merchant identifier. For example, the merchant identifier may comprise a string of alphanumeric and/or symbolic characters that are associated with the merchant system POS device 167. In this example embodiment, the merchant identifier is a unique string that is particular to the merchant system POS device 167 used at the merchant system 160 location at which the user 101 transacts. An example payment authorization request may also comprise a transaction amount, an account number and/or additional information identifying a user 101 financial account, and an account number and/or information identifying a merchant system 160 financial account.

In block 540, the issuer system 140 or financial institution system 150 receives the payment authorization request. In an example embodiment, the issuer system 140 receives the payment authorization request via the acquirer system 130 over a credit card network from the merchant POS device 167. In another example embodiment, the financial institution system 150 receives the payment authorization request.

As previously discussed, in an example embodiment, the payment authorization request received by either the issuer system 140 or the financial institution system 150 comprises the merchant identifier.

In block 550, the issuer system 140 or financial institution system 150 approve or deny the payment authorization request. In an example embodiment, the issuer system 140 determines that the user's 101 credit account associated with the payment authorization request has enough available credit to cover the transaction amount and approves the payment authorization request. In an example embodiment, the financial institution system 150 approves the payment authorization request if the user 101 has enough funds deposited in the user's 101 account associated with the payment authorization request to cover the transaction amount. In an example embodiment, when the issuer system 140 approves the payment authorization request, the issuer system 140 adds the transaction amount to the user's credit account. In an example embodiment, when the financial institution system 150 approves the payment authorization request, the financial institution system 150 debits the user's 101 bank account for the transaction amount.

If the payment authorization request is not approved, the method 230 proceeds to block 560. In an example embodiment, the issuer system 140 determines that the user 101 does not have enough available credit in the credit account to cover the transaction amount and denies the payment authorization request. In an example embodiment, the financial institution system 150 denies the payment authorization request if the user 101 does not have enough funds deposited in the user's 101 account to cover the transaction amount.

In block 560, the payment processing system 120 cancels the transaction. In an example embodiment, if the issuer system 140 or financial institution system 150 denies the payment authorization request, the appropriate system transmits a denial of the payment authorization request to the payment processing system 120 over the network 170. In this example embodiment, the payment processing system 120 cancels the transaction in response to receiving the denial of the payment authorization request. In an example embodiment, the payment processing system 120 may transmit a receipt to the user computing device 110 comprising a notification that the transaction request was denied or was not able to be processed.

Returning to block 550, if the payment authorization request is approved, the method 550 proceeds to 570. In an example embodiment, the issuer system 140 or financial institution system 150 transmits an approval of the payment authorization request to the payment processing system 120. In an example embodiment, the approval of the payment authorization request comprises the merchant identifier previously received from the merchant system POS device 167.

In block 570, the payment processing system 120 receives approval of the payment authorization request and receives a merchant identifier. As previously discussed, in an example embodiment, the approval of the payment authorization request comprises the merchant identifier. An example merchant identifier comprises a string of alphanumeric or symbolic characters identifying the merchant in the transaction. An example merchant identifier is particular to a merchant system POS device 167. For example, a merchant system 160 location may comprise three POS devices 167, each of the three POS devices 167 corresponding to a unique merchant identifier. In an example embodiment, merchant identifiers comply with formatting rules and must provide certain information about the merchant system 160 such as a merchant name, a zip code, and/or a city name. For example, merchant identifiers may be required to be in the format of "merchant name: zipcode." In this example, a merchant identifier corresponding to a POS device 167 at "George's Pizza" that is located in zip code 30040 may comprise "George's: 30040" or "George's Pizza: 30040." In certain example embodiments, the merchant system 160 associated with the POS device 167 creates and registers a merchant identifier for the POS device 167. In certain example embodiments, the merchant may enter the incorrect city name or incorrect zipcode when creating the merchant identifier.

In block 580, the payment processing system 120 completes the transaction. In an example embodiment, the payment processing system 120 may communicate with a financial account system associated with a merchant system 160 account to complete the transaction. For example, funds equal to the transaction amount are deposited into the bank account of the merchant system 160.

In block 590, the payment processing system 120 adds the transaction to the user's 101 transaction history with the merchant identifier. In an example embodiment, the user's 101 digital wallet account comprises a transaction history accessible by the user 101 to view past digital wallet transactions. For example, the transaction history comprises a list of individual transaction records comprising, for each transaction record, the date of the transaction, the time of the transaction, the amount of the transaction, the merchant identifier, and other relevant information associated with each transaction. In an example embodiment, in response to a successful transaction, the payment processing system 120 adds a transaction record to the user's 101 transaction history with the merchant identifier. In an example embodiment, the payment processing system 120 posts the transaction history in the user's digital wallet account on the payment processing system website 125. In an example embodiment, the user 101 can access the user's 101 transaction history via the digital wallet application 119 and/or the web browser 115 of the user computing device 110.

From block 590, the method 230 proceeds to block 240, in FIG. 2.

Returning to FIG. 2, in block 240, the payment processing system 120 determines if the merchant identifier is known. In an example embodiment, the payment processing system 120 comprises a directory of merchant identifiers, wherein each merchant identifier corresponds to a merchant system 160 identity and merchant system 160 location. In this example embodiment, if the merchant identifier is listed in the directory, the merchant identifier is known to the payment processing system 120.

If the merchant identifier is known to the payment processing system 120, the method 200 proceeds to block 270.

In block 270, the payment processing system 120 updates the transaction record with merchant information. In an example embodiment, the payment processing system 120 extracts information from the directory associated with the merchant identifier. For example, the payment processing system's 120 directory may comprise a merchant identity and a merchant location associated with merchant identifier in the transaction record. In an example embodiment, the payment processing system 120 retrieves additional information associated with the extracted merchant system 160 identity and location, such as a location on a map, hours of operation, a merchant system 160 website, a telephone number, an email address, a link to a merchant system 160 website, and/or additional useful or relevant information associated with the merchant system 160 identity and location. In this example embodiment, the payment processing system 120 communicates with the search system 180 to retrieve this additional information. In an example embodiment, the payment processing system 120 updates the transaction record by annotating the transaction record with the merchant identity, the merchant location, and/or the additional merchant information. In another example embodiment, the payment processing system 120 updates the transaction record by annotating the transaction record with a link that, when selected by the user 101 via the user computing device 110, directs the user computing device 110 web browser to a website comprising information associated with the merchant.

Returning to block 240, if the merchant identifier is unknown to the payment processing system 120, the method 200 proceeds to block 250. For example, the payment processing system 120 determines that the received merchant identifier is not listed in the payment processing system's 120 directory of merchant identifiers.

In block 250, the payment processing system 120 generates a list of candidate merchants based on the merchant identifier and user 101 location data. The method for generating a list of candidate merchants is described in more detail hereinafter with reference to the method 250 described in FIG. 6.

Figure 6:
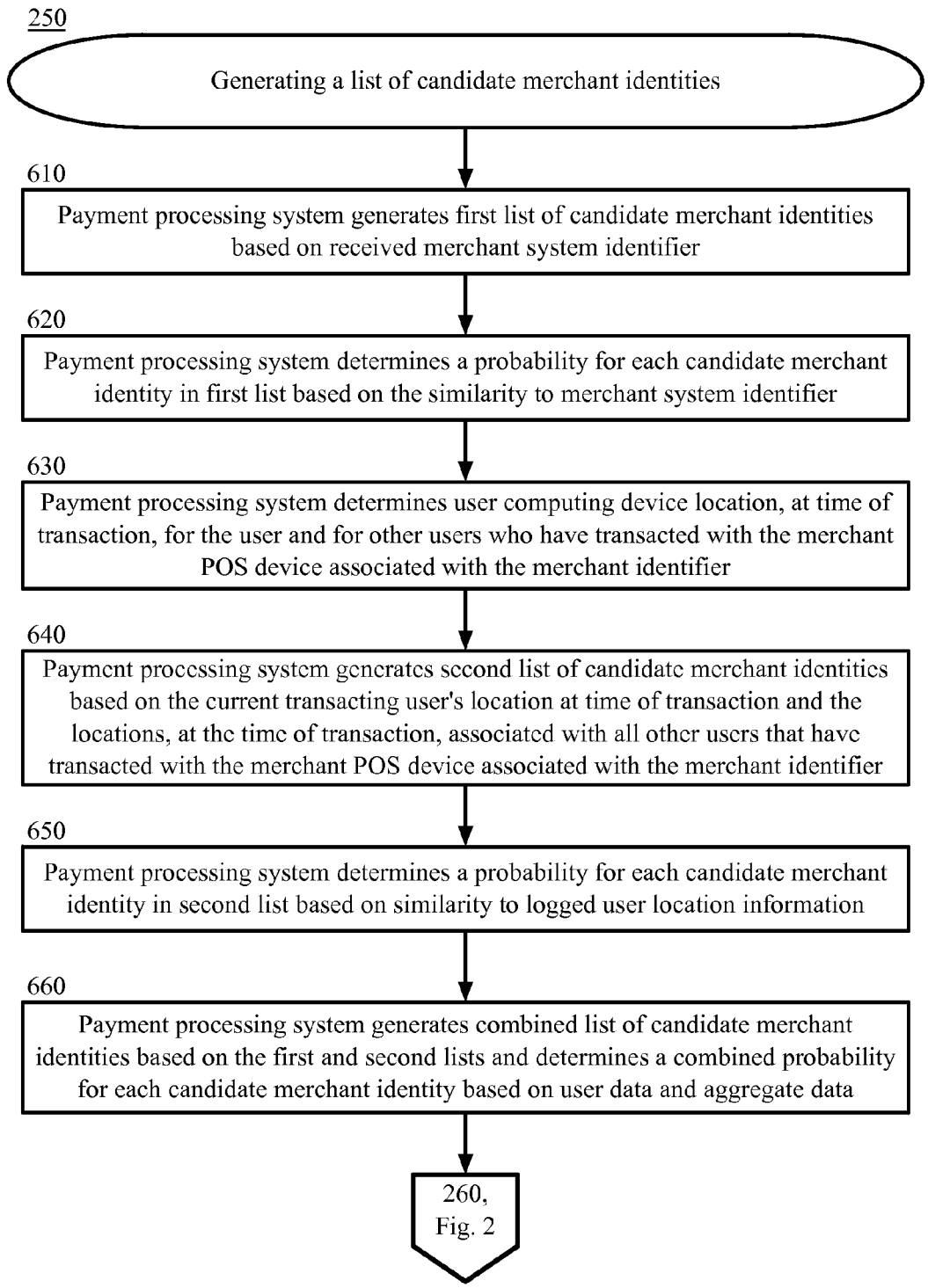
FIG. 6 is a block flow diagram depicting a method for generating a list of candidate merchants, in accordance with certain example embodiments.

FIG. 6 is a block diagram depicting a method 250 for generating a list of candidate merchants, in accordance with certain example embodiments. The method 250 is described with reference to the components illustrated in FIG. 1.

In block 610, the payment processing system 120 generates a first list of candidate merchants based on the received merchant identifier. In an example embodiment, the payment processing system 120 comprises a list of merchant identities that can be filtered by merchant identity, zip code, city name, or other information associated with the merchant identity. In an example embodiment, the received merchant identifier comprises a zip code associated with the merchant system 160 location. In this example embodiment, the payment processing system 120 extracts the zip code from the received merchant identifier and generates the first list of candidate merchants comprised of merchants from the list of merchant identities that are associated with the zip code. In an example embodiment, the received merchant identifier comprises all or part of the merchant system 160 identity. In this example embodiment, the payment processing system 120 may narrow down the candidate list to those merchant identities that most closely match the merchant identity in the merchant identifier. For example, the payment processing system receives a merchant identifier that reads "merchant: 'George's', zipcode: '23540'." In this example, the payment processing system 120 may generate a first list of candidate merchants comprising "George's Pizza, St. George Hospital, and George's Boat Supply" based on the merchant identifier, wherein each candidate merchant on the first list is associated with the zip code 23540.

In block 620, the payment processing system 120 determines a probability for each candidate merchant in the first list based on the similarity to the merchant identifier. For example, a merchant identifier that reads "merchant: 'George's', zipcode: '23540'" is more similar to candidate merchant identity "George's Pizza" than to candidate merchant identity "St. George Hospital." In an example embodiment, payment processing system 120 uses a bigram model to calculate the similarity between the merchant identifier and individual candidate merchant identities. For example, bigrams are groups of two adjacent characters in the merchant identifier or candidate merchant identity. In an example embodiment, the payment processing system 120 orders the first list of candidate merchant identities based on the determined probability for each of the candidate merchant identities. In an example embodiment, the payment processing system 120 expresses the probability for each candidate merchant in the first list as a decimal value greater than or equal to zero and less than or equal to one.

In block 630, the payment processing system 120 determines a user computing device 110 location, at a time of transaction, for the current transacting user 101 and for other users 101 that have transacted with the merchant POS device 167 associated with the merchant identifier. In an example embodiment, the user computing device 110 accesses a log of the user computing device 110 location that comprises a list of logged locations of the user computing device 110 associated with the user 101 associated with the current transaction and a corresponding time and date for each logged location. In this example embodiment, the user computing device 110 periodically transmits location data determined by the computing device to the payment processing system 120. For example, the user computing device 110 may transmit its current location to the payment processing system 120 at five minute intervals. In another example embodiment, the payment processing system 120 requested the user computing device 110 to transmit location data in response to receiving a payment authorization request from the user computing device 110. In this example embodiment, the user computing device 110 transmits its current location to the payment processing system 120 in response to receiving the request from the payment processing system 120. In an example embodiment, the log of the user computing device 110 location comprises the longitude and latitude of the user computing device 110 and the payment processing system 120 determines additional location information associated with that longitude and latitude. For example, the payment processing system 120 comprises a directory that associates location information with address information. For example, the payment processing system 120 determines a street name, mailbox number, zip code, city, state, and country name based on the received longitude and latitude. In an example embodiment, the payment processing system 120 accesses one or more logs of the user computing device 110 locations associated with other users 101 (other than the current transacting user 101) that have transacted with the merchant POS device 167 associated with the merchant identifier. In this example embodiment, the payment processing system 120 associates a logged user computing device 110 location at the time of transaction with each of the other users 101 for which transaction data comprises the same merchant identifier. In an example embodiment, the payment processing system 120 has not received or does not have access to location data, corresponding to the time of transaction with the merchant POS device 167, associated with the current transaction user 101. In an example embodiment, the payment processing system 120 has not received or does not have access to location data, corresponding to the time of transaction with the merchant POS device 167, associated with one or more of the users 101 other than the current transacting user 101.

In block 640, the payment processing system 120 generates a second list of candidate merchants based on the current transacting user's 101 location at the time of transaction and the locations, at the time of transaction, associated with all other users 101 that have transacted with the merchant POS device 167 associated with the merchant identifier. As previously discussed, in an example embodiment, the payment processing system 120 comprises a list of merchant identities that can be filtered by merchant identity, zip code, city name, or other information associated with the merchant identity. In an example embodiment, the payment processing system 120 accesses the list of merchant identities and selects merchant identities that are similar to the location information of the user computing device 110 at the time of the transaction to generate the second list of candidate merchant identities. As previously discussed, in an example embodiment, the payment processing system 120 has not received or does not have access to location data, corresponding to the time of transaction with the merchant POS device 167, associated with the current transaction user 101. In an example embodiment, the payment processing system 120 has not received or does not have access to location data, corresponding to the time of transaction with the merchant POS device 167, associated with one or more of the users 101 other than the current transacting user 101.

In block 650, the payment processing system 120 determines a probability for each candidate merchant in the second list based on similarity to the logged user 101 location information. For example, the payment processing system 120 may compare the zip code, city name, state name, country name, street address, time zone, and/or any other location-based information of the logged location and location information known by the payment processing system 120 associated with each candidate merchant in the list of candidate merchants. In an example embodiment, the payment processing system 120 expresses the probability for each candidate merchant in the second list as a decimal value greater than or equal to zero and less than or equal to one.

In block 660, the payment processing system 120 generates a combined list of candidate merchants based on the first and second lists and determines a combined probability for each candidate merchant based on user 101 data and aggregate data. In an example embodiment, the payment processing system 120 selects a certain number of candidate merchants having the highest probabilities from the first list and second list to generate the combined list. In another example embodiments, the payment processing system 120 generates a combined list comprising candidate merchants that are listed on both the first list and the second list. In an example embodiment, the payment processing system 120 calculates the combined probability for each candidate merchant on the combined list by multiplying the probability listed on the first list by the probability listed on the second list for each candidate merchant. In an example embodiment, the payment processing system 120 calculates the combined probability for each merchant based on the corresponding probabilities from the first and second lists and based on the aggregate location data associated with the merchant identifier and/or a search term received from the user 101. For example, the payment processing system 120 received, at a time before the transaction, a user 101 search term for "George's book store" or a user 101 selection of "George's Bookstore" from a list of search results. In this example, if the payment processing system's 120 generated combined list comprises a candidate merchant, among others, with the merchant identity "George's Bookstore," this candidate merchant may receive an increase in probability based on similarity to the user 101 search data.

From block 660, the method 250 proceeds to block 260, in FIG. 2.

Returning to FIG. 2, in block 260, the payment processing system 120 selects the candidate merchant on the combined list with the highest combined probability.

In block 270, the payment processing system 120 updates the transaction record with merchant system 160 information. The method for updating the transaction history with merchant system 160 information is described in more detail hereinafter with reference to the method 270 described in FIG. 7. In certain example embodiments, the payment processing system 120 does not update the transaction record with merchant system 160 information if the probability that the user 101 transacted at the selected candidate merchant is below a threshold probability. For example, on the combined list of candidate of candidate merchants, the probability that the user 101 transacted at "George's Pizza" is 0.45 and the probability that the user 101 transacted at "St. George Hospital" is 0.15. In this example, the threshold probability for updating the transaction record may be p=0.7, therefore, even though "George's Pizza" would be the selected candidate merchant, the payment processing system 120 would not update the user's 101 transaction record with the information because the probability does not equal or exceed the threshold.

Figure 7:
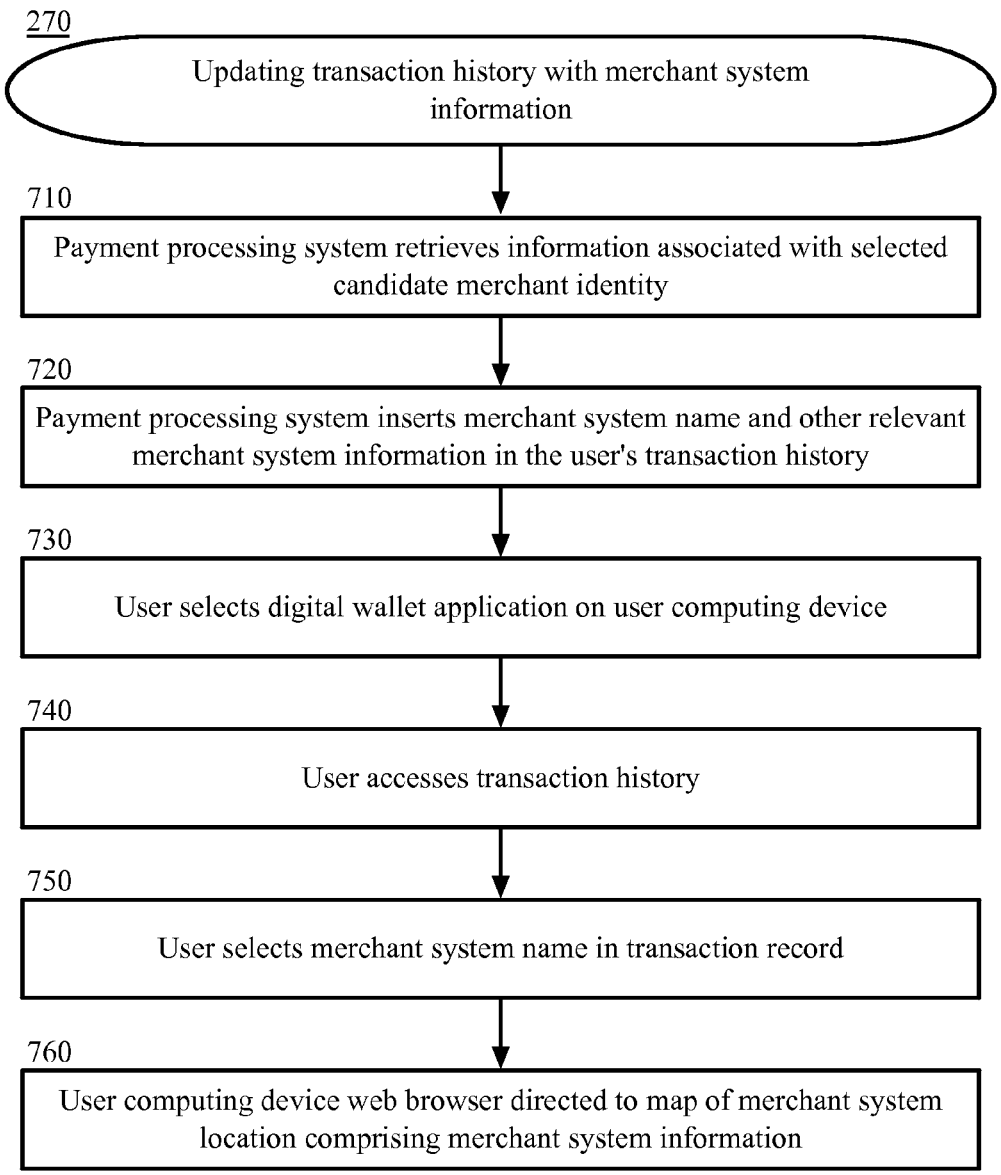
FIG. 7 is a block flow diagram depicting a method for updating transaction history with merchant information, in accordance with certain example embodiments.

FIG. 7 is a block diagram depicting a method 270 for updating the transaction history with merchant system 160 information, in accordance with certain example embodiments. The method 270 is described with reference to the components illustrated in FIG. 1.

In block 710, the payment processing system 120 retrieves information associated with the selected candidate merchant. In an example embodiment, the payment processing system 120 accesses information associated with the location of the candidate merchant. For example, the directory of merchant identities may comprise address information for the selected merchant identity, a merchant name, hours of operation, a telephone number, and/or other useful or relevant information. In another example, the payment processing system 120 may communicate with the search system 180 to retrieve information associated with the selected candidate merchant. In an example embodiment, the payment processing system 120 may communicate with another system associated with the payment processing system 120 to retrieve information associated with the selected candidate merchant identity. For example, a mapping system associated with the payment processing comprises a directory of merchant identities and associated information and the payment processing system 120 requests and receives this information from the mapping system. In an example embodiment, information associated with the selected candidate merchant comprises the location of the selected candidate merchant on a map.

In block 720, the payment processing system 120 inserts the merchant system 160 identity and other relevant merchant system 160 information in the user's 101 transaction history. In an example embodiment, the payment processing system 120 inserts the merchant system 160 identity and associated information directly in the user's 101 transaction history. In another example embodiment, the payment processing system 120 inserts a link that the user 101 may select to view the merchant system 160 identity and associated information. In an example embodiment, the payment processing system 120 may insert a link in the transaction history that, when selected by the user 101, directs the user 101 to a map comprising an indication of the location of the merchant system 160 associated with the transaction and additional merchant information such as a telephone number, hours of operations, a street address, and/or other relevant information. In yet another example embodiment, the payment processing system 120 annotates the transaction history with relevant information associated with the merchant identity.

In block 730, the user 101 selects the digital wallet application 119 on the user computing device 110. For example, the user 101 actuates an object on the user interface 111 of the user computing device 110 to select the digital wallet application 119. In another example embodiment, the user 101 accesses the user's 101 digital wallet account via the web browser 115.

In block 740, the user 101 accesses the transaction history. In an example embodiment, the user 101 may enter a user name and/or password to access the user's 101 account and transaction history. For example, the user 101 desires to review the user's 101 recent digital wallet transactions. In an example embodiment, the transaction history comprises a list of digital wallet transaction records in chronological order. An example transaction record may comprise a transaction date, a transaction time, a payment amount, a merchant identity, and associated merchant information.

In block 750, the user 101 selects the merchant system 160 identity in the transaction record. For example, the user 101 finds the transaction record for the transaction and selects the merchant identity by actuating an object on the user interface 111 of the user computing device. In an example embodiment, the payment processing system 120 selected this merchant system 160 identity from the combined list of candidate merchants and inserted the merchant system 160 identity in the transaction record.

In block 760, the user computing device 110 web browser 113 is directed to a map of the merchant system 160 location comprising merchant system 160 information. In an example embodiment, the merchant system 160 identity in the transaction name comprises a link that, when selected by a user 101, redirects the user computing device web browser 113 to a mapping system website. The example mapping system website may display a map comprising an indication of the location of the merchant system 160 and information associated with the merchant system 160 location.

Other Example Embodiments

FIG. 8 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with an opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the scope of the following claims, which are to be accorded the broadest interpretation so as to encompass such alternate embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method for annotating transaction histories, comprising:
    receiving, by one or more computing devices and from a search system, one or more search terms for a merchant from a user computing device;
    logging, by the one or more computing devices, location data received from the user computing device associated with a user, the location data corresponding to a physical location associated with the merchant at a time of a financial transaction between the user and the merchant;
    receiving, by the one or more computing devices and from an issuer system, an approval of a payment authorization request for the financial transaction and a merchant identifier associated with the merchant;
    determining, by the one or more computing devices, a location of the user computing device at the time of the financial transaction between the user and the merchant, based on the logged location data;
    generating, by the one or more computing devices, a list of candidate merchant identities based on the received merchant identifier and the determined location;
    retrieving, by the one or more computing devices, aggregate data associated with each candidate merchant identity comprising a first probability that the corresponding merchant identity corresponds to the merchant location;
    determining, by the one or more computing devices, a probability for each of the candidate merchant identities on the list of candidate merchant identities based on the received merchant identifier, the one or more search terms, the aggregate data, and the determined location, the probability indicating a combined probability that the corresponding merchant identity corresponds to the merchant location;
    selecting, by the one or more computing devices, a candidate merchant identity from the list of candidate merchant identities having the highest combined probability;
    annotating, by the one or more computing devices, a transaction record with the selected merchant identity, the annotated transaction record comprising a link to a map indicating the location of the merchant;
    communicating, by the one or more computing devices, the annotated transaction record to the user computing device for presentation via the user computing device causing the user computing device to display the annotated transaction record comprising the link;
    receiving, by the one or more computing devices from the user computing device, a selection of the link in the annotated transaction record; and
    transmitting, by the one or more computing devices to the user computing device, the map indicating the location of the merchant causing the user computing device to display the map indicating the location of the merchant.

2. The method of claim 1, further comprising:
    generating, by the one or more computing devices, a first sub list of candidate merchant identities based on the received merchant identifier and a second sub list of candidate merchant identities based on the determined user computing device location at the time of the transaction;
    determining, by the one or more computing devices, a probability for each candidate merchant identity in the first sub list based on similarity to the received merchant identifier; and
    determining, by the one or more computing devices, a probability for each candidate merchant identity in the second sub list based on similarity to information associated with the user computing device location at the time of the transaction,
        wherein the list of generated candidate merchant identities is generated based on the first and second sub lists, and
        wherein the probability for each candidate merchant identity on the list of generated candidate merchant identities is a product of the determined probability from the first sub list and the determined probability from the second sub list for that merchant identity.

3. The method of claim 1, wherein the merchant identifier comprises a string of alphanumeric characters and/or symbols, and wherein the merchant identifier is specific to a point of sale device at the merchant system location.

4. The method of claim 1, wherein determining the user computing device location at the time of the transaction comprises accessing a location history associated with the user computing device and selecting one or more location data within a certain time range of a time associated with the financial transaction, and wherein the list is generated based on the one or more selected location data.

5. A computer program product, comprising:
    a non-transitory computer-readable medium having computer-readable program instructions embodied thereon that when executed by a computer cause the computer to annotate transaction histories, the computer-readable program instructions comprising:
        computer-readable program instructions to receive, from the issuer system, an approval of the payment authorization request and a merchant identifier associated with the merchant system, wherein a user computing device communicates financial account information to a merchant point of sale device at a merchant location, and wherein the merchant point of sale device transmits a payment authorization request to an issuer system associated with the financial account information;
        computer-readable program instructions to determine the location of a user computing device at the time a merchant system point of sale device transmitted the payment authorization request to the issuer system;
        computer-readable program instructions to generate a combined list of candidate merchant identities based on the received merchant identifier and determined location;

computer-readable program instructions to determine a combined probability for each of the candidate merchant identities on the list of candidate merchant identities based on the received merchant identifier and determined location, the combined probability comprising a probability that the corresponding merchant identity corresponds to the merchant location at which the user initiated the transaction;

computer-readable program instructions to select a candidate merchant from the list of candidate merchants having the highest combined probability; and computer-readable program instructions to annotate a transaction record with the selected merchant identity, wherein the transaction record is accessible by user via the user computing device.

6. The computer program product of claim 5, further comprising computer-readable program instructions to log location data received from a user computing device associated with a user, wherein the user enters a physical location associated with a merchant system and wherein determining the location of the user computing device comprises retrieving the logged location data received from the user computing device.

7. The computer program product of claim 5, further comprising:

computer-readable program instructions to generate a first list of candidate merchant identities based on the received merchant identifier and a second list of candidate merchant identities based on the determined user computing device location at the time of the transaction;

computer-readable program instructions to determine a probability for each candidate merchant identity in the first list based on similarity to the received merchant identifier; and computer-readable program instructions to determine a probability for each candidate merchant identity in the second list based on similarity to information associated with the user computing device location at the time of the transaction, wherein the combined list is generated based on the first and second lists; and wherein the combined probability for each candidate merchant identity on the combined list is the product of the determined probability from the first list and the determined probability from the second list for that merchant identity.

8. The computer program product of claim 5, wherein the merchant identifier comprises a string of alphanumeric characters and/or symbols and wherein the merchant identifier is specific to a point of sale device at the merchant system location.

9. The computer program product of claim 5, wherein determining the user computing device location at the time of the transaction comprises accessing a location history associated with the user computing device and selecting one or more location data within a certain time range of the time the user initiated the transaction and wherein the combined list is generated based on the one or more selected location data.

10. The computer program product of claim 5, wherein the payment authorization request is transmitted to a financial institution system and wherein the approval of the payment authorization request and the merchant identifier are received from the financial institution system.

11. The computer program product of claim 5, further comprising computer-readable program instructions to receive, from a search system, one or more search terms submitted by the user via the user computing device at a time before the user initiates the transaction and wherein determining the combined probability for each of the candidate merchant identities on the list of candidate merchant identities is further based on the received one or more user search terms received from the search system.

12. A system for annotating transaction histories, comprising:

a storage device; and a processor communicatively coupled to the storage device, wherein the processor executes application code instructions that are stored in the storage device to cause the system to:

receive, from an issuer system, an approval of the payment authorization request and a merchant identifier associated with a merchant system, wherein a user enters a physical location associated with the merchant system, wherein the user computing device communicates financial account information to a merchant point of sale device at the merchant location, and wherein the merchant point of sale device transmits a payment authorization request to an issuer system associated with the financial account information;

determine the location of a user computing device associated with the user at the time a transaction request was transmitted by the user computing device;

generate a combined list of candidate merchant identities based on the received merchant identifier and determined location;

determine a combined probability for each of the candidate merchant identities on the list of candidate merchant identities based on the received merchant identifier and determined location, the combined probability comprising a probability that the corresponding merchant identity corresponds to the merchant location at which the user initiated the transaction;

select a candidate merchant identity from the list of candidate merchant identities having the highest combined probability; and annotate a transaction record with the selected merchant identity, wherein the transaction record is accessible by user via the user computing device.

13. The system of claim 12, wherein the processor is further configured to execute computer-readable program instructions stored in the storage device to cause the system to log location data received from a user computing device associated with a user, wherein the user enters a physical location associated with the merchant system and wherein determining the location of the user computing device comprises retrieving the logged location data received from the user computing device.

14. The system of claim 12, wherein the processor is further configured to execute computer-readable program instructions stored in the storage device to cause the system to receive, from the user computing device, at a time before receiving the request to process the payment transaction, a search term from a user computing device, wherein determining the combined probability for each of the candidate merchant identities is further based on the received search term.

15. The system of claim 12, wherein determining the user computing device location at the time of the transaction comprises accessing a location history associated with the user computing device and selecting one or more location data within a certain time range of the time the user initiated the transaction and wherein the combined list is generated based on the one or more selected location data.

16. The system of claim 12, wherein the payment request is transmitted to a financial institution system and wherein the approval of the payment authorization request and the merchant identifier are received from the financial institution system.

17. The system of claim 12, wherein the merchant identifier comprises a string of alphanumeric characters and/or symbols and wherein the merchant identifier is specific to a point of sale device at the merchant system location.

18. The system of claim 12, wherein the processor is further configured to execute computer-readable program instructions stored in the storage device to cause the system to:

generate a first list of candidate merchant identities based on the received merchant identifier and a second list of candidate merchant identities based on the determined user computing device location at the time of the transaction;

determine a probability for each candidate merchant identity in the first list based on similarity to the received merchant identifier; and determine a probability for each candidate merchant identity in the second list based on similarity to information associated with the user computing device location at the time of the transaction, wherein the combined list is generated based on the first and second lists; and wherein the combined probability for each candidate merchant identity on the combined list is the product of the determined probability from the first list and the determined probability from the second list for that merchant identity.

* * * * *